Figure 3:
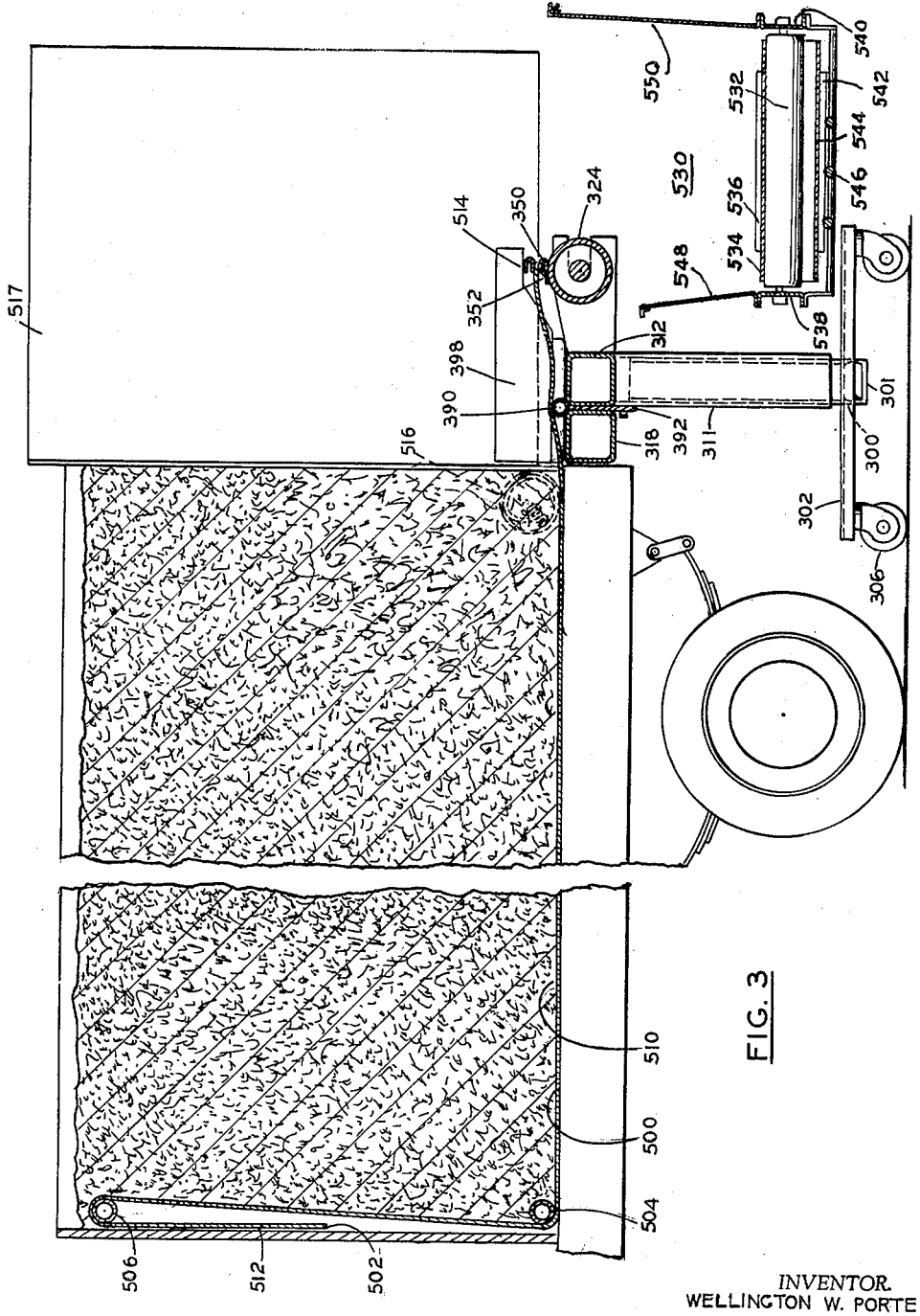

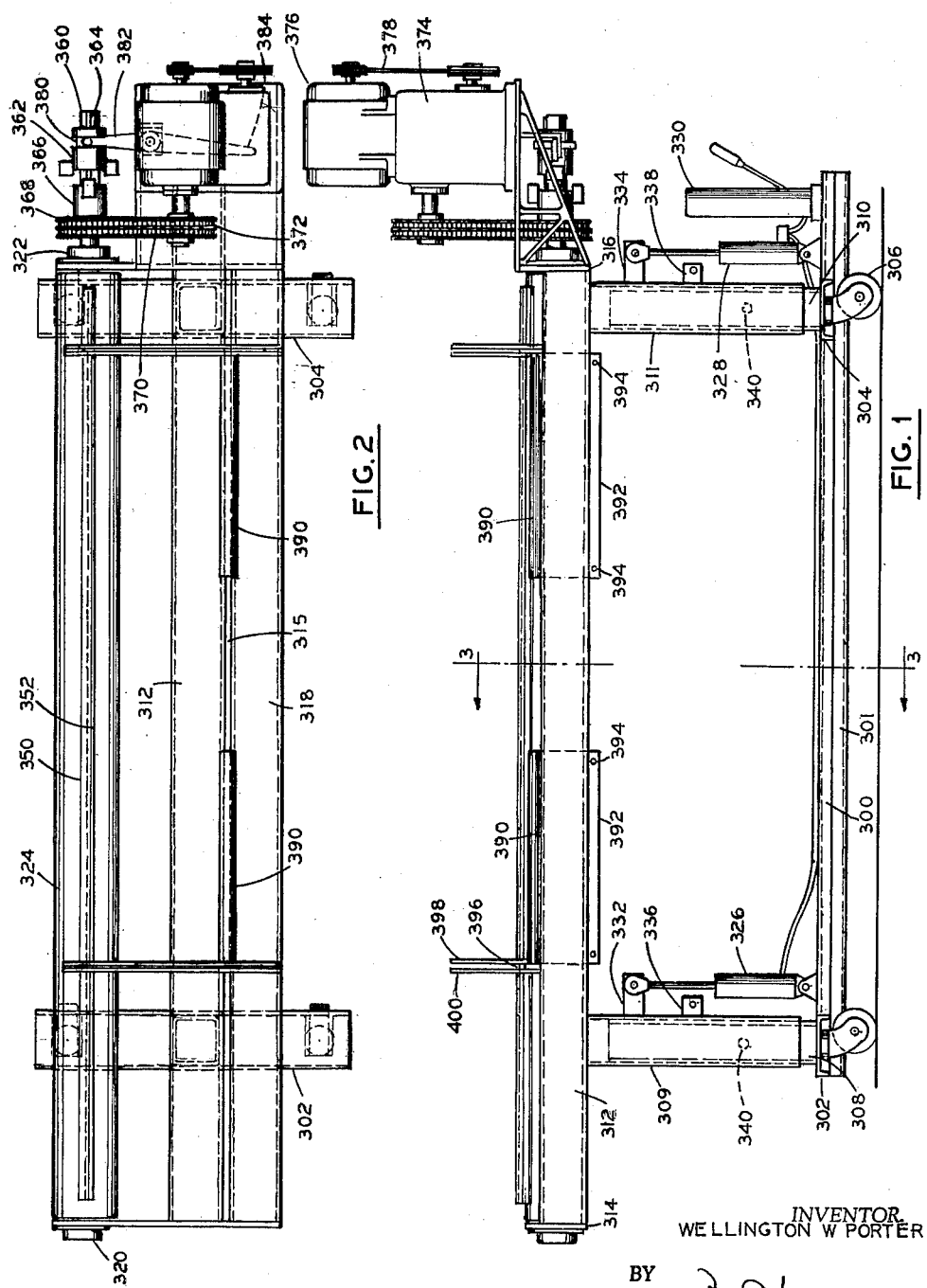

June 22, 1965 W. W. PORTER 3,190,471
HARVESTER UNLOADER
Filed April 18, 1963 2 Sheets-Sheet 2

INVENTOR.
WELLINGTON W. PORTER
BY
ATTORNEY

3,190,471
HARVESTER UNLOADER
Wellington W. Porter, R.D. 2, Waterloo, N.Y.
Filed Apr. 18, 1963, Ser. No. 274,044
5 Claims. (Cl. 214—44)

This invention relates to harvest handling and more particularly to an apparatus for harvest transfer from truck to conveyor.

In the harvesting of spinach, beans and similar vegetables, it is important that the handling time from cutting to processing, as for freezing, canning or for the market be reduced to the minimum and also that the labor involved be kept at a minimum. It is the practice to harvest crops of the type mentioned by apparatus capable of cutting and delivering the harvest immediately to a truck or trucks which follow the harvesting apparatus around the field. As soon as one truck is loaded, a second empty truck takes its place. It is then necessary to unload the truck at some distant point, and desirably that the unloading take place without damage to the crop.

In accordance with the present invention each truck, before being loaded is provided with canvas, duck or other flexible webbing which is applied to the truck bed, the webbing being of a length greater than that of the bed and having at one end, attachment means for securing to a power winch roll located at the unloading destination. The unloading is accomplished by backing the truck up to the winch apparatus, the roll of which is adapted to be secured to the end of the webbing. The webbing is then reeled up upon the roll, drawing the harvest load supported thereon from the truck. A suitable conveyor disposed beneath the winch roll receives the harvest load as fast as it is drawn over the roll. The winch apparatus is adapted to be elevated to a height corresponding to the varying heights of various truck loads, which height varies with the weight of the load. The winch or reel is power driven at a speed of rotation of about one revolution per minute by a gear reduction providing the necessary pulling power. The drive is through a clutch that is readily released, whereby upon completion of an unloading operation the webbing may be quickly unrolled, and drawn therefrom for replacement over the bed of the truck, to prepare the same for return to the field for reloading.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings wherein like reference characters indicate like parts:

FIGURE 1 is a side elevational view of the unloader;
FIGURE 2 is a plan view of the unloader; and
FIGURE 3 is a transverse sectional view of the unloader taken substantially on the line 3—3, and illustrating the same in unloading position in reference to a harvest loaded truck.

Referring to the drawings there is shown an unloading unit adapted for use where power is available, and where final unloading from roadway vehicles is desired. The unit comprises a lower frame work comprising longitudinal channel members 300 and 301 with their flanges welded to form a box beam, and having transverse members 302 and 304, provided with casters 306. Projecting upwardly from the transverse members 302 and 304 are columns 308 and 310, which may be of square box section. Telescopically and slidably disposed around the columns 308 and 310 are square section supports 309 and 311, the upper ends of which are welded to a square column bed member 312. Welded to the ends of the member 312 are transverse plates 314 and 316, which support a second square section bed member 318, spaced a half inch from member 312. The plates 314 and 316 also support bearings 320 and 322 for the winch roll or reel member 324. Hydraulic lift cylinders 326 and 328 are provided to raise and lower in unison the ends of the bed members, and may be actuated by a hydraulic hand pump 330. The hydraulic lift cylinders are shown connected to lugs 332 and 334 projecting from the supports 309 and 311 a sufficient distance so that the lift cylinders clear a second and shorter lug on each leg, as indicated at 336 and 338. The columns 308 and 310 each have a transverse aperture 340 extending therethrough. When the height of the bed, formed by the members 312 and 318, must necessarily be higher than the stroke of the hydraulic lift cylinders will allow, when attached to lugs 332 and 334, the support members 309 and 311 are lifted sufficiently to clear the apertures 340, and a heavy pin is then inserted, to hold the supports 309 and 311 elevated. While thus elevated the hydraulic lift cylinders are transferred to lugs 336 and 338. Thus the height of the bed can be varied through a wide range to satisfy a wide variety of truck bed heights.

The roll 324 is provided with a lengthwise strip 350 welded to the roll along one edge 352 to provide a somewhat tangential hook to receive a complementary hook 514 on the end of the canvas web, and the spacing between the roll 324, and bed member 312 is such as to permit the reeling upon the roll 324, of a considerable length of canvas web.

The roll 324 is provided with a heavy drive shaft 360 having at its end, a jaw clutch element 362, slidably splined to the shaft as at 364. The jaw clutch element 362 is adapted to be engaged with a mating jaw clutch element 366, which is affixed to a multiple sprocket 368, the element 366 and sprocket 368 being freely rotatable upon the shaft, but held against axial movement by collars or the like, as will be understood in the art. The multiple sprocket is driven by a multiple chain 370 from a multiple driving sprocket 372 of a speed reducer 374. The speed reducer is driven by a reversible motor 376, as by a belt drive 378. The jaw clutch element has a groove 380, and shifting yoke 382 therein, adapted to be actuated by a manual lever 384.

Slidably disposed on the bed members 312 and 318, over the half inch space 315 therebetween, are tubular members 390 of a diameter of about an inch or inch and a quarter. The tubular members have depending wings or blades 392 welded along the underside of the members, and which extend through the space 315 between and to a point below the members 312 and 318. Suitable pins 394 may be provided to hold the members 390 upon the bed, although slidable therealong. The opposite ends of the tubular members have affixed thereto as by welding, a half inch plate 396 to which are welded spaced plates 398 and 400, which are of a height, and length to suitably support therebetween, guide boards, such as half inch plywood, of a size as large as four feet by eight feet, the boards being set in between the respective pairs of plates 398 and 400 when a truck is backed up to the bed member 318 for unloading, with its tail gate dropped or its rear doors opened. The members 390 are slid along the bed members 312 and 318 to bring the plates 398 and 400 into substantial alignment with the truck side walls and the plywood boards such as 517, see FIGURE 3, are then set in place between the plates to cooperate with and abut the truck side walls to form in effect an extension thereof. If desired the boards may in practice, be spaced a little wider than the truck side walls, and be positioned so as to in part overlap the outside of the truck side walls.

As indicated in FIGURE 3, prior to loading a truck, the bed of the truck is covered by a canvas webbing 510 of a width to substantially correspond with the width of the truck bed 500, and a length substantially longer than the truck bed.

At the forward end of the truck bed, there may be provided a transverse bar 504 adjacent the bed 500, and the forward end of the truck 502, and a second bar 506 may be provided adjacent the forward end near the top of the truck sides. As soon as a truck is unloaded, a canvas web 510 is drawn forwardly over the truck bed, passed beneath the bar 504, and the end 512 draped over the bar 506. The other end of the web with its end provided with a hook 514, may be rolled as indicated in dotted lines at 516 at the rear end of the bed, so as to be accessible when the tail gate, or rear doors are opened. When the tail gate or rear doors, as the case may be are closed, the truck is ready for loading. Spinach, beans or other harvest are loaded into the truck upon the canvas web, and when the truck is fully loaded, it proceeds to the unloading station, where it is backed up to the unloading winch apparatus of FIGURES 1 and 2 as for example in the manner shown in FIGURE 3. Upon adjusting the bed of the winch to a proper height, commensurate with the height of the truck bed, the rear doors of the truck may be swung open, the side boards placed in position, and the rolled end of the web extracted, laid across the bed of the winch, and the hook end 514 thereof coupled to the hook 350 of the roll 324. Thereafter the motor is started, and the conveyor 530 started, and the jaw clutch element 362 engaged. The gradual reeling up of the canvas 510 on the roll 324 gradually withdraws the harvest load rearwardly from the truck, and as the supporting web is wound upon the reel, the harvest drops upon the conveyor 530 and is dispatched to such further processing location is desired. With a 5½ inch winch roll, rotating at about one revolution per minute, the entire harvest load of several tons may be withdrawn from the truck in a matter of minutes. As the webbing reels up upon the winch, the effective diameter increases, and the rate of unloading thus gradually increases. The torque load on the winch drive however will be seen to remain relatively constant since as the effective diameter increases, the amount of harvest remaining decreases, and thus the tension on the webbing gradually diminishes The tension on the webbing during unloading is counteracted by the thrust of the bed member 318 bearing against the rear end of the truck, as will appear from FIGURE 3, the member 318 being adjustable in height to correspond to the height of the truck bed. As soon as the truck is unloaded, and the harvest dispatched by the conveyor, the clutch is disengaged, the webbing is drawn back into the truck over the truck bed, and the forward end again passed beneath the rod 504 and draped over the rod 506. To provide for free unreeling of the winch, the clutch is disengaged during this operation, and in order to facilitate the disengagement of the clutch, any winch winding torque on the clutch may be relieved by reversing the motor 376 briefly, whereupon the clutch elements will be freed for release.

If the truck be of the tail gate variety, such tail gate may be lowered to form an extension of the truck bed, and a somewhat longer length of canvas web employed, or the tail gate may be allowed to hang below the truck to permit the location of the winch apparatus at the rear end of the truck bed. In general, harvest when loaded into such a truck, so intertwines and mats, so that on opening the rear doors, or lowering the tail gate the harvest does not tend to fall rearwardly, but on the contrary retains its constituency in block like form, as formed within the four side walls of the truck during loading.

Thus the winch apparatus may be placed in position, the doors opened, and the web hooked to the winch roll, without any tendency of spillage. However, once the web is gradually reeled upon the winch roll, the entire mass of harvest gradually moves en masse, in block form, the mass breaking up and dropping upon the conveyor as the webbing is reeled from under the mass.

The conveyor comprises end rolls such as 532, one of which is power driven, as will be understood, a conveyor belt 534 of rubber or rubber fabric composition, and spaced transverse rubber cleats 536. The belt may be of less width than the space between the side frame members 538 and 540, to allow dirt and small stones to escape from the side edges of the belt, and the belt may be held centered by the cleats 542 on the return reach of the belt 544, riding on parallel bars 546, which support the belt, and create slight grooves in the cleats. Suitable aprons 458 and 550 are provided to direct the harvest onto the conveyor belt.

It can be seen that with the apparatus and the procedure described, unloading of a truck may be effected with almost no manual effort, and expeditiously. Furthermore the crop is unloaded without danger of injury as by bruising, as might occur in dump truck operation. It can further be seen that the need for heavy dump truck dumping apparatus is completely eliminated, so that a truck of light weight construction, and capable of use in fields may be used to load and unload in repeated rapid operation. The operation may be carried on with such expedition that vegetables freshly picked may be delivered to the freezer in a fraction of an hour.

While a form of the invention has been shown which is adapted for use where power is available, it will be apparent that the apparatus may take on various forms, and be driven by an internal combustion engine for field use, as for example in the transfer of crops from a field vehicle to a road vehicle.

While a single form of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A harvest truck unloading apparatus comprising a frame adapted to be disposed transversely of and adjacent to the rear unloading end of a harvest truck, a platform supported upon said frame, means to vary the height of said platform whereby to align it substantially on a level with a truck bed to be unloaded, said platform being of a length longer than the width of a truck to be unloaded, and adapted along one side thereof to abut the rear unloading end of a truck, end members secured to said platform projecting beyond the other side thereof, a roll journalled in said end members with its upper surface approximately tangential with said platform, said roll being of a length at least as great as the width of the truck bed, and having a hook disposed thereon extending lengthwise therealong for receiving the hook end of an elongate flexible fabric adapted to cover the bed of a truck before the loading thereof, power means including speed reduction gearing for driving said roll to draw a fabric hooked thereon across said platform, and reel the fabric upon said roll and to draw harvest supported on said fabric across said roll for gravitational discharge, a clutch for disengaging said driving means from said roll to permit free unreeling of a flexible fabric therefrom, and conveyor means disposed beneath said roll and adapted to convey harvest gravitating thereon from said gravitational discharge.

2. An unloading apparatus in accordance with claim 1, wherein the driving means comprises means for reversing the power drive thereof.

3. A harvest truck unloading apparatus comprising a frame, adapted to be disposed transversely of and adjacent to the rear unloading end of a harvest truck, a platform supported upon said frame, means to vary the height of said platform whereby to align it substantially on a level with a truck bed to be unloaded, said platform being of a length longer than the width of a truck to be unloaded, and adapted along one side thereof to abut the rear unloading end of a truck, end members secured to said platform projecting beyond the other side thereof, a roll journalled in said end members with its upper surface approximately tangential with said platform, said roll being of a length at least as great as the width of the truck bed, and having a hook disposed thereon extending lengthwise therealong for receiving the hook end of an elongate flexible fabric adapted to cover the bed of a truck before loading thereof, means for driving said roll including speed reduction gearing to draw a fabric hooked thereon slowly across said platform, and reel the fabric upon said roll and to draw harvest supported on said fabric across said roll for gravitational discharge therebeyond and means mounted on said platform for supporting upright panels above said platform and roll in extending relation to the side walls of the truck.

4. A harvest truck unloading apparatus comprising a frame, adapted to be disposed transversely of and adjacent to the rear unloading end of a harvest truck, a platform supported upon said frame, means to vary the height of said platform whereby to align it substantially on a level with a truck bed to be unloaded, said platform being of a length longer than the width of a truck to be unloaded, and adapted along one side thereof to abut the rear unloading end of a truck, end members secured to said platform projecting beyond the other side thereof, a roll journalled in said end members with its upper surface approximately tangential with said platform, said roll being of a length at least as great as the width of the truck bed, and having a hook disposed thereon extending lengthwise therealong for receiving the hook end of an elongate flexible fabric adapted to cover the bed of a truck before loading thereof, reversible power means for driving said roll including speed reduction gearing to draw a fabric hooked thereon slowly across said platform, and reel the fabric upon said roll and to draw harvest supported on said fabric across said roll for gravitational discharge, a jaw clutch for disengaging said driving means from said roll to permit free reeling of a flexible fabric therefrom, means mounted on said platform for supporting upright panels above said platform and roll in extending relation to the side walls of the truck, and conveyor means disposed beneath said roll and adapted to convey harvest gravitating thereon from said gravitational discharge.

5. A harvest truck unloading apparatus comprising a frame adapted to be disposed transversely of and adjacent to the rear unloading end of a harvest truck, a platform supported upon said frame, means to vary the height of said platform whereby to align it substantially on a level with a truck bed to be unloaded, said platform being of a length longer than the width of a truck to be unloaded, and adapted along one side thereof to abut the rear unloading end of a truck, end members secured to said platform projecting beyond the other side thereof, a roll journalled in said end members with its upper surface approximately tangential with said platform, said roll being of a length at least as great as the width of the truck bed, and having a hook disposed thereon extending lengthwise therealong for receiving the hook end of an elongate flexible fabric adapted to cover the bed of a truck before the loading thereof, power means including speed reduction gearing for driving said roll to draw a fabric hooked thereon across said platform, and reel the fabric upon said roll and to draw harvest supported on said fabric across said roll for gravitational discharge, and a clutch for disengaging said driving means from said roll to permit free unreeling of a flexible fabric therefrom.

References Cited by the Examiner

UNITED STATES PATENTS

| 837,170 | 11/06 | Wishon | 214—83.34 X |
| 1,567,945 | 12/25 | Hays | 198—218 X |
| 2,129,796 | 9/38 | Swift | 214—83.34 |
| 2,355,226 | 8/44 | Mallory | 214—83.34 |
| 2,422,910 | 6/47 | Katinos | 214—38 |
| 2,529,263 | 11/50 | Reese. | |
| 2,563,158 | 8/51 | Claffey | 214—83.34 |

FOREIGN PATENTS 556,433   4/23   France.

HUGO O. SCHULZ, *Primary Examiner.*

GERALD M. FORLENZA, *Examiner.*